US005709953A

United States Patent [19]
Goto et al.

[11] Patent Number: 5,709,953
[45] Date of Patent: Jan. 20, 1998

[54] EXTRUDABLE RESIN FOR POLYSTYRENE AND LAMINATE

[75] Inventors: Sumio Goto, Arlington Heights; Mark S. Pucci, Elk Grove; John Machonis, Jr., Schaumburg; Mitsu Shida, Barrington, all of Ill.

[73] Assignee: Morton International, Inc., Chicago, Ill.

[21] Appl. No.: 604,513

[22] Filed: Feb. 21, 1996

[51] Int. Cl.⁶ ............................................. B32B 27/08
[52] U.S. Cl. ...................... 428/474.4; 428/517; 428/521; 428/516; 525/71; 525/74; 525/78
[58] Field of Search ............................... 428/474.4, 516, 428/517; 525/71, 74, 78

[56] References Cited

U.S. PATENT DOCUMENTS

| | | | |
|---|---|---|---|
| 4,058,647 | 11/1977 | Inoue et al. | 428/516 |
| 4,861,676 | 9/1989 | Lee | 428/474 |
| 4,861,677 | 8/1989 | Lee | 428/516 |

*Primary Examiner*—E. Rollins Buffalow
*Attorney, Agent, or Firm*—Wayne E. Nacker; Gerald K. White

[57] ABSTRACT

An extrudable adhesive composition is provided which is useful for bonding a layer of a polystyrene resin to a layer of a second resin. The extrudable adhesive composition comprises A) an ethylene polymer fraction at between about 35 and about 65 wt percent relative to the total of A) plus B), the ethylene polymer fraction comprising an ethylene polymer, copolymer or mixture of ethylene polymers and copolymers, each ethylene polymer or copolymer being formed from at least about 60 weight percent ethylene monomers, balance other copolymerizable monomers, and the ethylene polymer fraction A) being formed, in total, of at least about 65 weight percent ethylene monomers, balance, other copolymerizable monomers, and B) between about 35 and about 65 wt %, relative to total of A) plus B), of a styrene/aliphatic/styrene triblock elastomer, between about 20 and about 60 wt % of said triblock elastomer comprising styrene monomers.

The $MI_{2(SB)}^2/MI_{2(PE)}$ is about 1.0 or above.

9 Claims, No Drawings

EXTRUDABLE RESIN FOR POLYSTYRENE AND LAMINATE

The present invention is directed to extrudable adhesives and particularly to extrudable adhesives for bonding a layer of a polystyrene resin to a layer of a second resin.

BACKGROUND OF THE INVENTION

Many food packaging applications utilize a container formed from a multi-layer, extruded laminate. One typical type of single-service, shelf-stable container is formed of an extruded laminate of polystyrene/adhesive/ethylene vinyl alcohol (EVOH)/adhesive/polyethylene. The polystyrene is desirable as an outer layer in that it is very heat-formable, being formable in a non-molten state at a temperature above a glass transition temperature. Polyethylene is a desirable inner layer in that it is inert, has desirable organoleptics (taste/odor properties) and often serves as an effective heat-seal layer. EVOH (saponified ethylene vinyl acetate) as an intermediate layer is known for its excellent gas barrier properties. Furthermore EVOH acts as a chemical barrier, inhibiting the flow of chemicals, such as polyatyrene-plasticizing oils, from the contained food to the polystyrene layer.

The present invention is directed to an extrudable adhesive for adhering polystyrene resins, such as are used in a multi-layer food packaging laminates, to layers of other resins, particularly more polar resins, such as EVOH and nylon, but also to non-polar resins, such as polyethylene. Generally, oxygen-containing and nitrogen-containing polymers are more polar than polystyrene.

U.S. Pat. Nos. 4,861,676 and 4,861,677, the teachings of each of which are incorporated herein by reference, describe extrudable adhesives, adherent to polystyrene, which contain substantial amounts of ethylene vinyl acetate (EVA). It is desirable to minimize or eliminate EVA in extrudable adhesives because EVA exhibits poor heat stability, limiting the flexibility of coextrusion processes using such adhesives. Furthermore, EVA is a relatively expensive material.

U.S. Pat. No. 4,058,647, the teachings of which are incorporated herein by reference, teaches rubber-containing modified polyolefin compositions which may be laminated to polyolefin resins as well as to more polar resins such as polyester, polyamide (nylon), or EVOH. This patent, however, is silent as to the suitability of the rubber-containing modified polyolefin composition for bonding to polystyrene and does not teach how to provide a rubber-containing modified polyolefin composition which forms an excellent bond to polystyrene.

SUMMARY OF THE INVENTION

In accordance with the present invention there is provided an extrudable adhesive composition for bonding polystyrene resin to a second resin such as oxygen- or nitrogen-containing resins, such as EVOH, polyesters, and polyamides (nylon) or to non-polar resins, such as polyethylene. The extrudable adhesive comprises A) an ethylene polymer fraction at between about 35 and about 65 wt percent relative to the total of A) plus B), the ethylene polymer fraction comprising an ethylene polymer, copolymer or mixture of ethylene polymers and copolymers, each ethylene polymer or copolymer being formed from at least about 60 weight percent ethylene monomers, balance other copolymerizable monomers, and the ethylene polymer fraction A) being formed, in total, of at least about 65 weight percent ethylene monomers, balance, other copolymerizable monomers.

If the resin layer to which the polystyrene layer is to be bonded is substantially non-polar, such as polyethylene, the ethylene polymer fraction A) may contain no polar graft moieties. However, if the second resin layer to which the polystyrene layer is to be bonded contains oxygen, e.g., ethylene vinyl alcohol (EVOH) or contains nitrogen, e.g. nylon, the ethylene polymer fraction comprises between about 0.1 and 100 wt % of graft ethylene polymer having grafted thereto an unsaturated carboxylic acid or anhydride, balance (if any) an unmodified ethylene polymer, such that the ethylene polymer fraction A) comprises, in total, between about 0.01 and about 5 wt %, graft monomers having carboxylic acid or carboxylic acid anhydride functionality. The extrudable adhesive also comprises B) between about 35 and about 65 wt %, relative to total of A) plus B), of a styrene/aliphatic/styrene triblock elastomer, between about 20 and about 60 wt % of the triblock elastomer B) comprising styrene monomers. To provide good adhesion to polystyrene, it is found that the $MI_{2(SB)}^2/MI_{2(PE)}$ should be about 1.0 or above, preferably about 4.0 or above. It is believed that this relation between the melt indices promotes co-continuous phases of the ethylene polymer fraction A) and the styrene/aliphatic/styrene triblock elastomer B) of the extrudable adhesive composition, whereby there is substantial molecular contact of the elastomer B) with the polystyrene resin layer and substantial molecular contact of the ethylene polymer fraction A) with the second resin layer to which the polystyrene layer is adhered.

The invention further comprises a laminate of a polystyrene resin layer and a second polymer resin layer adhered with an extrudable adhesive comprising a graft polyethylene fraction A) and a styrene/aliphatic/styrene triblock elastomer B) as set forth above.

DETAILED DESCRIPTION OF CERTAIN PREFERRED EMBODIMENTS

The adhesive composition of the present invention adheres well to any polystyrene resin composition. Herein, a polystyrene resin composition is defined as a resin composition containing at least 70 wt % up to 100 percent of a resin that is either a styrene homopolymer or a styrene copolymer that contains, in addition to styrene monomers, up to about 30 wt % comonomer monomers. For multi-layer laminate coextrusion, high impact polystyrene (HIPS) resin compositions are used, containing up to about 30 wt % of an elastomer, typically between about 10 and about 15 wt % of an elastomer. Suitable elastomers for use as impact modifiers in styrene resin compositions include natural rubber and synthetic rubbers, such as styrene-butadiene rubber, acrylonitrile-butadiene rubber, butyl rubber, chloroprene rubber, silicone rubber, acryl rubber, urethane rubber, polybutadiene rubber, ethylene propylene rubber, etc. In high impact polystyrene resin compositions, the elastomer exists as a dispersed phase in the styrene polymer.

In the adhesive composition of the present invention, the polyethylene fraction A) and the styrene/aliphatic/styrene triblock elastomer B) exist as a two-phase system in which domains of the elastomer B) promote adhesion to the polystyrene resin composition and domains of the polyethylene fraction A), to a second resin.

The triblock elastomer is formed of sufficient styrene content and utilized in sufficient amount so that the styrene blocks promote excellent adhesion to polystyrene. Thus, the styrene/aliphatic/styrene triblock elastomer is formed from between about 20 and about 60 wt % styrene monomers (i.e.

has a styrene monomer content of between about 20 and about 60 wt %), balance aliphatic monomers, and the triblock elastomer B) comprises between about 35 and about 65 wt % of the total of polyethylene fraction A) plus triblock elastomer B). The aliphatic middle block of the triblock elastomer may be unsaturated, such as a polybutadiene block or a polyisoprene block, polybutadiene being the currently preferred middle block. Also, the middle block may be saturated, e.g., styrene/ethylene-butene/styrene rubber, or only partially unsaturated, such as may be provided by hydrogenation or partial hydrogenation of an unsaturated middle block.

If the second resin layer, to which the polystyrene resin layer is adhered is non-polar, such as polyethylene, the polyethylene fraction A) is preferably non-polar.

On the other hand, when the second resin is adhered to a polar resin which contains N or O atoms, nylon and EVOH being particularly important in this regard, it is preferred that the polyethylene fraction A) contain a significant content of graft monomer having carboxylic acid or carboxylic acid anhydride functionality. Depending upon the nitrogen or oxygen-containing polymer to be adhered, the total amount of carboxylic acid or carboxylic acid anhydride-containing monomer is between about 0.01 and about 5 wt % of the polyethylene fraction A), preferably between about 0.5 and about 3 wt %. A variety of unsaturated carboxylic acids and anhydrides may be grafted to polyethylene, such as acrylic acid, methacrylic acid maleic acid, fumaric acid, itaconic acid, and maleic anhydride, etc. Multifunctional unsaturated acids and anhydrides are preferred. Maleic anhydride is the most common unsaturated monomer used in such grafting and is currently preferred. Grafting is accomplished by known techniques, such as in a free radical reaction as is taught above-referenced U.S. Pat. No. 4,058,647. As is known in the art, it is generally equivalent to either graft the unsaturated acid or anhydride to the whole amount of polyethylene or to graft the unsaturated acid or anhydride to only a portion of the polyethylene fraction and then mix the grafted portion of the polyethylene with additional unmodified polyethylene to obtain the desired level of grafting in the polyethylene fraction A). Accordingly, the modified polymer may comprise between 0.1 wt % and 100% of the polyethylene fraction A), balance unmodified polyethylene.

Herein EVOH is defined as a copolymer of ethylene and vinyl acetate wherein ethylene monomer comprises between about 20 and about 50 mole percent of the copolymer and vinyl acetate comprises between about 50 and about 80 mole percent of the copolymer and wherein at least about 80% of the vinyl acetate monomers are saponified to provide —OH functionality.

The polyethylenes used in the adhesive compositions of the present invention include ethylene homopolymers and copolymers of ethylene and other monomers, such as α-olefins. α,β-ethylenically unsaturated monomers, such as vinyl acetate, ethyl acrylate and butyl acrylate may also be copolymerized with ethylene. However, as noted above, monomers of ester-containing monomers, particularly monomers of vinyl acetate, may detract from heat stability and are relatively expensive. Thus, the content of α,β-ethylenically unsaturated monomers is kept below about 25 wt % of the polyethylene fraction A) of the adhesive composition, preferably below about 10 wt %, more preferably below about 2 wt % and most preferably about 0 wt %.

The density of the polyethylene fraction A) may range from low to high density, e.g., from 0.860–0.970. However, it is preferred that the polyethylene fraction A) have a relatively low density, e.g., from 0.860–0.935. In providing a polyethylene fraction A) with a low density, all of the polyethylene content need not be of low density. For example, one currently used way of providing a low density polyethylene fraction A) is to graft a significant amount of maleic anhydride with a high density polyethylene and admix a relatively small amount of the grafted high density polyethylene with a relatively large amount of linear low density polyethylene (LLDPE), thereby achieving both the desired final density and desired level of graft maleic anhydride.

Depending upon a number of factors, there is a tendency for one or the other of polyethylene resin fraction A) or triblock elastomer fraction B) to form a continuous phase with the other fraction contained as discrete domains therein. The continuous phase, in such case, provides good adhesion to the layer to which it is intended to provide adhesion, but the other phase has very little contact with either resin layer and therefor does not contribute significantly to adhesion through intermolecular interaction. In prior art graft polyolefin compositions containing elastomers, which compositions were used for adhering polyolefin layers to more polar layers, the elastomer was added to strengthen the adhesive composition, not to promote adhesion. For such purposes, compositions were produced in which the elastomer existed as discrete, compact domains within a continuous phase of the graft polyolefin fraction. In accordance with the invention, however, it is preferred that the polyethylene resin fraction A) and the triblock elastomer fraction B) exist, at least after co-extrusion, as co-continuous phases, whereby the triblock elastomer fraction B) phase has substantial contact with the styrene resin layer and the polyethylene resin fraction A) phase has substantial contact with the second polemic resin layer to which the polystyrene layer is bonded. To this end, it is found that there is a relationship between the melt indices of the triblock elastomer phase ($MI_{2(SB)}$) and the ethylene polymer phase ($MI_{2(PE)}$). Specifically, it is found that $MI_{2(SB)}^2/MI_{2(PE)}$ should have a value of about 1.0 or above, preferably 4.0 or above. $MI_2$s of the triblock elastomer phase and the ethylene polymer phase are each measured in accordance with ASTM D1238, and $MI_2$ denotes the melt index at 190° C. under a load of 2,160 g (2.16 kg) measured in accordance with ASTM D1238. The $MI_2$ for the ethylene polymer fraction represents the $MI_2$ of the entire ethylene polymer fraction, whether all ungrafted, all grafted, or a mixture of grafted and ungrafted ethylene polymer.

Adhesive compositions in accordance with the present invention should provide adhesion to a polystyrene layer of at least 2.0 lbs. per inch, preferably at least 2.5 lbs per inch, and most preferably at least 3.0 lbs per inch when measured in accordance with ASTM D1876/T-Peel Test.

The invention will now be described in greater detail by way of specific Examples.

EXAMPLE 1A

A composition was prepared consisting of: 1) 60% by weight of a polyethylene (melt index 1.9) containing 0.3% by weight maleic anhydride and 2) 40% by weight of a styrene-butadiene (SB) copolymer (melt index 6.1). This composition was compounded on a 1" Sterling extruder at 400° F. and was then coextruded into a sheet as a tie layer between EVOH and polystyrene (EVOH=Soarnol® DC, 32% ethylene, 3.2 MI; polystyrene=Chevron EC 6600

HIPS). The structure of the coextruded sheet is as follows: HIPS (39%)/Tie (6%)/EVOH (10%)/Tie (6%)/HIPS (39%). Total thickness of the sheet is 13 mil.

The melt index is the ethylene polymer and the SB copolymer were measured at 190° C./2.16 kg. The square of the melt index of the SB copolymer ratioed to the melt index of the ethylene polymer fraction ($MI^2_{SB}/MI_{PE}$) is shown in Table 1 below. Adhesion was measured on 1-inch wide strip at room temperature, 10 inches/minute.

EXAMPLE 1B

Example 1 was repeated except that the styrene-butadiene component used had a lower melt index, resulting in a lower $MI^2_{SB}/MI_{PE}$.

EXAMPLES 2A-4B

Example 1 was repeated with different polyethylene and SB copolymers, resulting in different SB copolymers, resulting in different $MI^2_{SB}/MI_{PE}$.

TABLE 1

| Example | % PE | MI of PE | % SB | MI of SB | $MI^2_{SB}/MI_{PE}$ | Adhesion to PS (Lbs./In.) |
|---|---|---|---|---|---|---|
| Example 1A | 60 | 1.9 | 40 | 6.1 | 19.5 | 3.8 |
| Example 1B | 60 | 1.9 | 40 | 2.8 | 4.2 | 2.8 |
| Example 2A | 60 | 2.5 | 40 | 6.1 | 14.6 | 3.5 |
| Example 2B | 60 | 2.5 | 40 | 2.8 | 3.1 | 2.0 |
| Example 3 | 60 | 7.1 | 40 | 6.1 | 5.2 | 3.2 |
| Example 4A | 60 | 19 | 40 | 6.1 | 2.0 | 2.2 |
| Example 4B | 60 | 19 | 40 | 2.8 | 0.42 | 0.4 |

Examples 1A to 4B show that a $MI^2_{SB}/MI_{PE}$ greater than 1.0 is necessary for good adhesion to PS (preferably greater than 3.0).

EXAMPLES 5-10

Example 1A is compared to compositions having various levels of SB.

TABLE 2

| Example | % PE | MI of PE | % SB | MI of SB | Adhesion to EVOH (Lb./In.) | Adhesion to PS (Lbs./In.) |
|---|---|---|---|---|---|---|
| Example 5 | 90 | 1.9 | 10 | 1.6 | Excellent | 0.1 |
| Example 6 | 80 | 1.9 | 20 | 1.6 | Excellent | 0.5 |
| Example 7 | 65 | 1.9 | 35 | 1.6 | Excellent | 3.5 |
| Example 1A | 60 | 1.9 | 40 | 1.6 | Excellent | 3.5 |
| Example 8 | 50 | 1.9 | 50 | 1.6 | Good | 3.5 |
| Example 9 | 40 | 1.9 | 60 | 1.6 | Good | 3.4 |
| Example 10 | 20 | 1.9 | 80 | 1.6 | Poor | 3.0 |

Examples of 5-10 show that the range of SB for good adhesion to both EVOH and PS is 35-65% SB (optimum being about 40%).

What is claimed is:

1. An extrudable adhesive composition useful for bonding a layer of a polystyrene resin to a layer of a second resin, said extrudable adhesive composition comprising A) an ethylene polymer fraction at between about 35 and about 65 wt percent relative to the total of A) plus B), the ethylene polymer fraction comprising an ethylene polymer, copolymer or mixture of ethylene polymers and copolymers, each ethylene polymer or copolymer being formed from at least about 60 weight percent ethylene monomers, balance other copolymerizable monomers consisting of α-olefin monomers, and the ethylene polymer fraction A) being formed, in total, of at least about 65 weight percent ethylene monomers, balance, other copolymerizable α-olefin monomers, and B) between about 35 and about 65 wt %, relative to total of A) plus B), of a styrene/aliphatic/styrene triblock elastomer, between about 20 and about 60 wt % of said triblock elastomer comprising styrene monomers the $MI_{2(SB)}^2/MI_{2(PE)}$ being about 1.0 or above.

2. A composition according to claim 1 wherein said $MI_{2(SB)}^2/MI_{2(PE)}$ is about 4.0 or above.

3. A composition according to claim 1 wherein said ethylene polymer fraction comprises between about 0.1 and 100 wt % of ethylene polymer having grafted thereto a graft monomer which is an unsaturated carboxylic acid or anhydride, said graft monomer comprising between about 0.01 and about 5 wt % of said ethylene polymer fraction A).

4. A three-layer laminate comprising a polystyrene resin layer, an intermediate layer which is an adhesive resin composition layer and a second adhered resin layer, the improvement wherein said intermediate resin layer is formed of an adhesive composition comprising A) an ethylene polymer fraction at between about 35 and about 65 wt percent relative to the total of A) plus B), the ethylene polymer fraction comprising an ethylene polymer, copolymer or mixture of ethylene polymers and copolymers, each ethylene polymer or copolymer being formed from at least about 60 weight percent ethylene monomers, balance other copolymerizable monomers consisting of α-olefin monomers, and the ethylene polymer fraction A) being formed, in total, of at least about 65 weight percent ethylene monomers, balance, other copolymerizable α-olefin monomers, and B) between about 35 and about 65 wt %, relative to total of A) plus B), of a styrene/aliphatic/styrene triblock elastomer, between about 20 and about 60 wt % of said triblock elastomer comprising styrene monomers the $MI_{2(SB)}^2/MI_{2(PE)}$ being about 1.0 or above.

5. A laminate according to claim 4 wherein said $MI_{2(SB)}^2/MI_{2(PE)}$ is about 4.0 or above.

6. A laminate according to claim 4 wherein said second adhered resin layer is polyethylene.

7. A laminate according to claim 4 wherein said second adhered resin layer is an oxygen-containing and/or nitrogen-containing polymer and said ethylene polymer fraction comprises between about 0.1 and 100 wt % of ethylene polymer having grafted thereto a graft monomer which is an unsaturated carboxylic acid or anhydride, said graft monomer comprising between about 0.01 and about 5 wt % of said ethylene polymer fraction A).

8. A laminate according to claim 7 wherein said second adhered resin layer is polyamide.

9. A laminate according to claim 7 wherein said second adhered resin layer is poly(ethylene vinyl alcohol).

* * * * *

UNITED STATES PATENT AND TRADEMARK OFFICE
CERTIFICATE OF CORRECTION

PATENT NO. : 5,709,953
DATED : January 20, 1998
INVENTOR(S) : Goto et al.

It is certified that error appears in the above-indentified patent and that said Letters Patent is hereby corrected as shown below:

Column 1, line 22, delete "polyatyrene" and insert --polystyrene-- therefor.

Column 5, line 49, delete "3.5" and insert --3.8-- therefor.

Signed and Sealed this

Eleventh Day of August 1998

*Attest:*

BRUCE LEHMAN

*Attesting Officer*   *Commissioner of Patents and Trademarks*